(12) United States Patent
Minnick et al.

(10) Patent No.: US 7,444,642 B2
(45) Date of Patent: Oct. 28, 2008

(54) METHOD FOR INDICATING COMPLETION STATUS OF ASYNCHRONOUS EVENTS

(75) Inventors: Linden Minnick, Hillsboro, OR (US); Roy Callum, Beaverton, OR (US); Patrick L. Connor, Portland, OR (US)

(73) Assignee: Intel Corporation, Santa Clara, CA (US)

(*) Notice: Subject to any disclaimer, the term of this patent is extended or adjusted under 35 U.S.C. 154(b) by 554 days.

(21) Appl. No.: 10/003,134

(22) Filed: Nov. 15, 2001

(65) Prior Publication Data

US 2003/0093578 A1 May 15, 2003

(51) Int. Cl.
*G06F 3/00* (2006.01)
*G06F 13/28* (2006.01)

(52) U.S. Cl. ......................... 719/310; 710/24
(58) Field of Classification Search ................ 719/310, 719/328; 710/5, 24, 14
See application file for complete search history.

(56) References Cited

U.S. PATENT DOCUMENTS

| | | | | |
|---|---|---|---|---|
| 4,366,536 A * | 12/1982 | Kohn | ........................ | 711/206 |
| 4,783,730 A * | 11/1988 | Fischer | ........................ | 710/5 |
| 4,939,644 A * | 7/1990 | Harrington et al. | ............. | 710/5 |
| 5,131,082 A * | 7/1992 | Bonevento et al. | ............. | 710/5 |
| 5,315,500 A * | 5/1994 | Uchishiba et al. | ............. | 700/78 |
| 5,812,877 A * | 9/1998 | Young | ........................ | 710/24 |
| 6,073,236 A * | 6/2000 | Kusakabe et al. | ........... | 713/169 |
| 6,088,740 A * | 7/2000 | Ghaffari et al. | ................ | 710/5 |
| 6,295,604 B1 | 9/2001 | Callum | | |
| 6,366,117 B1 * | 4/2002 | Pang et al. | .................... | 326/38 |
| 6,442,621 B1 * | 8/2002 | Kondo et al. | .................... | 710/5 |
| 6,567,862 B1 * | 5/2003 | Saito | ............................. | 710/5 |
| 6,738,831 B2 * | 5/2004 | Wolrich et al. | ................. | 710/5 |
| 2002/0083189 A1 | 6/2002 | Connor | | |
| 2002/0194332 A1 | 12/2002 | Connor | | |
| 2003/0065735 A1 | 4/2003 | Connor | | |

* cited by examiner

*Primary Examiner*—Meng-Ai An
*Assistant Examiner*—Lechi Truong
(74) *Attorney, Agent, or Firm*—Robert A. Greenberg (57) ABSTRACT

The present disclosure describes a method comprising issuing a plurality of commands to a controller, wherein the commands are issued in a first order, and wherein the completion status of commands is written to the memory in a second order, and wherein the second order may be different from the first order. Also described is an apparatus comprising a controller adapted to accept a plurality of commands, wherein the commands are issued in a first order, and completion status of commands is written to the memory in a second order, and wherein the second order may be different from the first order.

33 Claims, 5 Drawing Sheets

METHOD FOR INDICATING COMPLETION STATUS OF ASYNCHRONOUS EVENTS

TECHNICAL FIELD

This disclosure relates generally to controllers, and in particular, but not exclusively, relates to indicating completion status for asynchronous events.

BACKGROUND

Various types of device controllers, such as input/output (I/O) controllers, complete tasks assigned to them by a driver in the order the commands for the tasks are issued. For example, if an I/O controller is asked to send a data packet A, then a data packet B and then a data packet C, it will send the packets in that exact order. For simple tasks such as transmitting packets, or for tasks that are roughly equal in complexity and execution time, this serial operation is desirable. But in more complex operations where a controller is simultaneously working on several tasks in parallel, completion of tasks in the order of command issuance may not be desirable, such as where the tasks to be performed vary widely in completion time. For example, in a case where a controller is instructed to (1) encrypt a large block of data, and (2) transmit an unrelated packet of data, the packet transmission operation may use different functional units within the controller than the encryption operation. In this case, the transmit operation can be completed well before the large block encryption. But with the prior art operational-descriptor interfaces, the commands must be completed in order of issuance. Therefore, even if a controller is capable of out-of-order command completion, there is no method for the controller to signal command completion in any order different than the order in which the commands were issued.

Forcing the controller to complete the commands in order has serious implications for the performance of a device in which the controller is installed. For controllers that can accomplish a combination of complex and simple commands, the complex commands may add significant undue latency to the completion indication of the subsequent simple commands. Certain computer applications are also hindered, for example when the application needs a completion indication before proceeding to some subsequent task.

One approach that has been tried is simply to add multiple operation-descriptor interfaces (i.e., command interfaces or descriptor rings) to the device. The primary drawback of this approach is the cost associated with each additional command interface. Another complexity results from the mechanism that may be used to implement additional functions (such as encryption and authentication) within a network controller. As the latency for completing an event increases, it becomes more complex for the controller to keep track of the order of the original commands.

BRIEF DESCRIPTION OF THE DRAWINGS

Non-limiting and non-exhaustive embodiments of the present invention are described herein with reference to the following figures, wherein like reference numerals refer to like parts throughout the various views unless otherwise specified.

DETAILED DESCRIPTION OF THE ILLUSTRATED EMBODIMENTS

Embodiments of a system and method for indicating completion status for asynchronous events are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" do not necessarily refer to the same embodiment. Furthermore, the particular features, structures, or characteristics may be combined in any suitable manner in one or more embodiments.

Figure 1A:
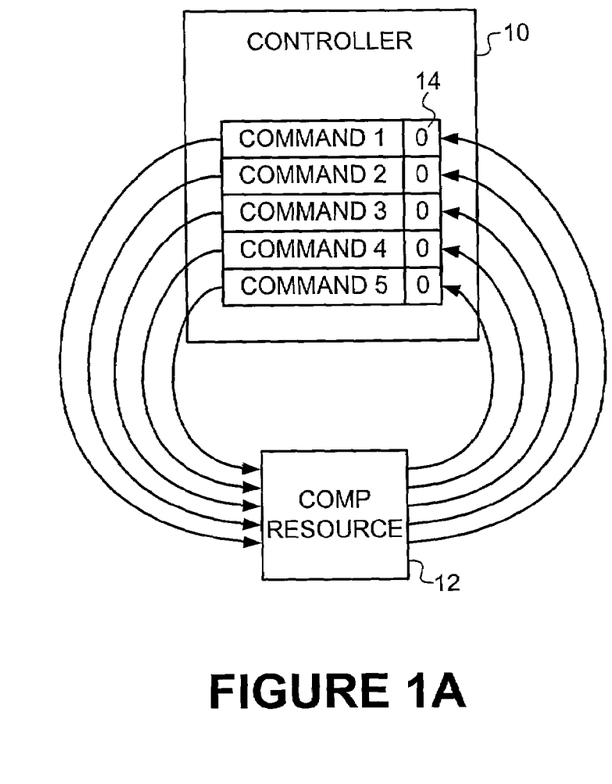
FIG. 1A is a drawing of an example of a controller issuing commands and receiving the completion status for each command.
Figure 1B:
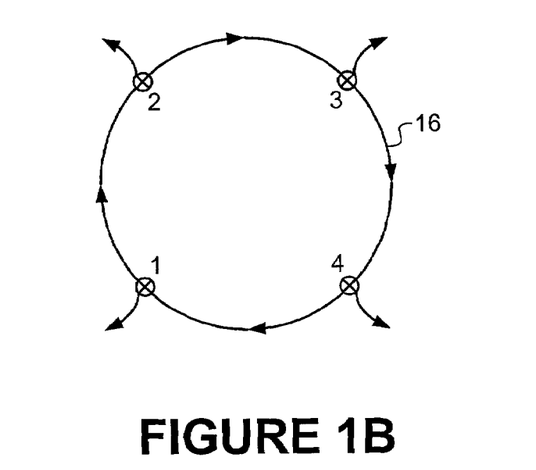
FIG. 1B is a drawing illustrating the descriptor ring concept by which the controller of FIG. 1A received completion notifications.

FIGS. 1A and 1B together show an example in which a controller 10 issues a plurality of commands 1-5 in a specified order to a computational resource 12 which will execute the commands. Generally, each command is part of an operational descriptor which, aside from the command itself, includes a "done indication" 14 whose value depends on whether the command contained in the operational descriptor has been completed. One example of a "done indication" is a "done bit," which may have a value of 0 until the command is completed, and a value of 1 after completion. Each operational descriptor is stored in a memory location on the controller, and the operational descriptor remains in the same memory location until the "done indication" indicates that the command has been completed. When a command has been completed, a new operational descriptor can then overwrite the memory location taken up by the completed command.

After the controller issues the commands, the controller is notified of the completion of each command in the same order in which the commands were issued. The controller 10 thus implicitly assumes that, if notice has not been received that a task has been completed, then subsequent tasks in the order cannot have been completed; this is true even if the commands themselves were executed out of order. Thus, if the commands were issued in the order shown (1-5), the completion notification for each command must also come back in that order. Thus, in many systems the commands are issued in order, but a later command in the queue must wait for receipt of completion notification of all earlier-issued commands before the later command can be completed.

FIG. 1B illustrates one example of a "descriptor ring" concept that illustrates how both the commands and their completion notifications are done serially. Both the commands and their completion notification must follow the path of the ring 16. Thus, the controller issues command 1, then proceeds along the ring 16 to issue command 2, then command 3, then command 4, and so forth. Proceeding around the ring 16, when all the commands have been issued it is time to receive the completion notification for each command. Again starting on the ring 16 at number 1, completion notification for command 1 is received, and then completion notification for command 2 is received, then further along the ring, where completion notification of command 3 is received, and so forth. In other examples of descriptor rings, all commands need not be issued before any completion indications are received. In one example, commands and their completion notifications could be alternately issued and received, such that command 1 could be issued, then completion notification 1 received, then command 2 issued, then completion notification 2 received, and so on. Regardless of the particular sequencing of commands and their completion notifications, the distinguishing feature of a descriptor ring is that a subsequent command must wait for completion notification of a previous command. This descriptor ring concept of serial issuance of commands and serial receipt of completion notification has various disadvantages. For example, some applications will not send a new request until the previous one has been completed. The current scheme, which requires the notification of completion in the same order as the commands were issued thus increases latency in applications because it slows down notification of completion.

Figure 2:
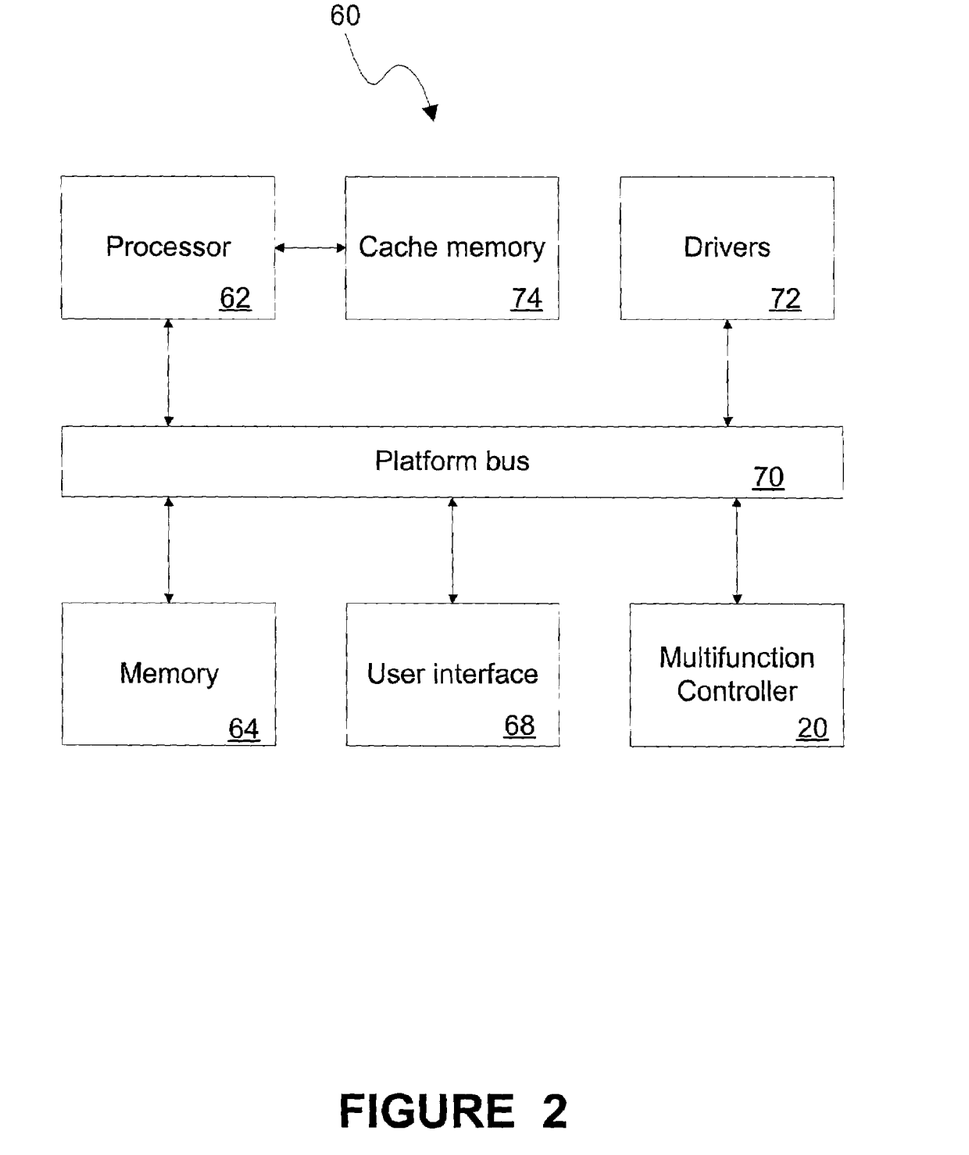
FIG. 2 is a block drawing of a computing platform including an embodiment of the present invention.

FIG. 2 illustrates the components of an embodiment of a computing platform 60 utilizing an embodiment of the present invention. The computing platform 60 will typically be a computing device such as a personal computer (PC), server, or the like. The platform 60 includes a processor 62, a memory 64, a user interface 68, a platform bus 70, drivers 72, and a multifunction controller 20. The processor, memory, user interface, drivers and multifunction controller are all connect to, and in communication with the platform bus 70. The platform bus 70 functions as a system-wide communication channel, so that by virtue of their connection to the platform bus 70, the other components are in communication with each other as well. Also attached to the processor 62 is a cache memory 74, which provides a certain amount of local, high-speed memory to the processor. An embodiment of the multifunction controller 20 is further discussed below.

Figure 3:
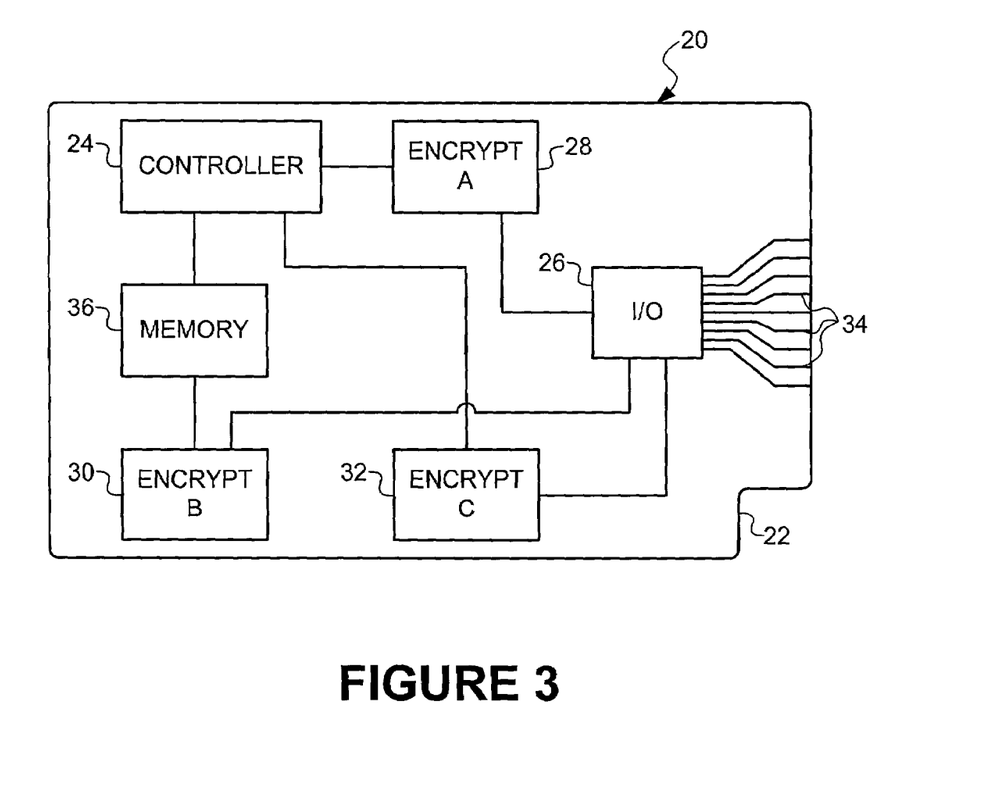
FIG. 3 is a drawing of a device that embodies the present invention.

FIG. 3 shows a device in the form of a multifunction controller 20 capable of communication and cryptography operations that illustrates an embodiment of the present invention, which allows a completion status to be written to a programmable location, rather than to the same memory location where the operational descriptor including the command is stored. Although discussed herein in the context of a multifunction controller 20, the device could be of another type, and could be implemented differently, such as by implementing all the functions of the multifunction controller on a single chip. The multifunction controller 20 includes a plurality of units that are integrated into the multifunction controller 20. The plurality of units in the multifunction controller 20 includes a bus interface controller 24, an input-output (I/O) unit 26 and various computational units that carry out commands issued by the driver. In this embodiment, the computational resources include a first encryption unit 28, a second encryption unit 30, and a third encryption unit 32. The first, second and third encryption units 28, 30 and 32 on the multifunction controller 20 each implements a different type of encryption algorithm, depending on the level of security a user wants. For example, the first unit 28 may implement an AES encryption engine, the second unit 30 may implement a 3DES encryption engine, and the third unit 32 may implement a third encryption scheme. Data Encryption Standard (DES) is a block cipher algorithm for encrypting data; it both enciphers and deciphers data using a 40-bit or 56-bit key specified in the Federal Information Standard publication 46, dated Jan. 15, 1977. Advanced Encryption Standard (AES) is a standard for encryption intended to replace DES. AES is a symmetric, or private key, algorithm with a block cipher supporting key length ranging from 128 to 256 bits and variable length blocks of data.

In operation, the multifunction controller 20 receives input, such as commands from the driver software, through bus interface controller 24, and in response it issues commands to the various computational units on the multifunction controller 20 to achieve the desired result. The controller is in communication with a memory 36, or alternatively with the memory 64 of the computing platform 60 in which the multifunction controller 20 is installed. Among other functions, the memory stores operational descriptors containing commands that are to be issued or have been issued, and also receives the notification completion indication when each of the commands have been executed. If a user wants only a low level of security, they instruct their application to encrypt using the first encryption unit 28. The driver then sends the data to the multifunction controller 20 multifunction controller, where the first encryption unit 28, encrypts the data and signals a notification that the task has been completed. When the driver receives the completion notification from the encryption unit 28, the driver then issues an instruction to the encryption unit to transfer the data to the I/O unit 26. Once the data transfer is complete, the controller might instruct the I/O unit 26 to send the data to another destination, such as another card in a communication system, or out over a computer network. If the user wants a higher level of security, they instruct their application to use one of the other encryption units 30 or 32, and the process is similar. When the controller 24 issues commands to the different components on the card, the components each notify the controller when the command has been completed. Alternatively, a user may want to simultaneously perform two independent operations, such as an encryption command executed by one of the encryption units 28, 30 or 32, and a transmit command executed by the I/O unit 26. Since these operations are independent the multifunction controller can perform them in any order, although to reduce latency in communications it is desirable to execute the transmit command first because it has a much shorter execution time than the encryption operation.

Of course, the multifunction controller 20 is only one possible embodiment of a device that can be used in the present invention; other embodiments that carry out different functions and include different components (e.g., components other than encryption units) are possible. Different numbers of computational resources on the device are also possible.

Figure 4:
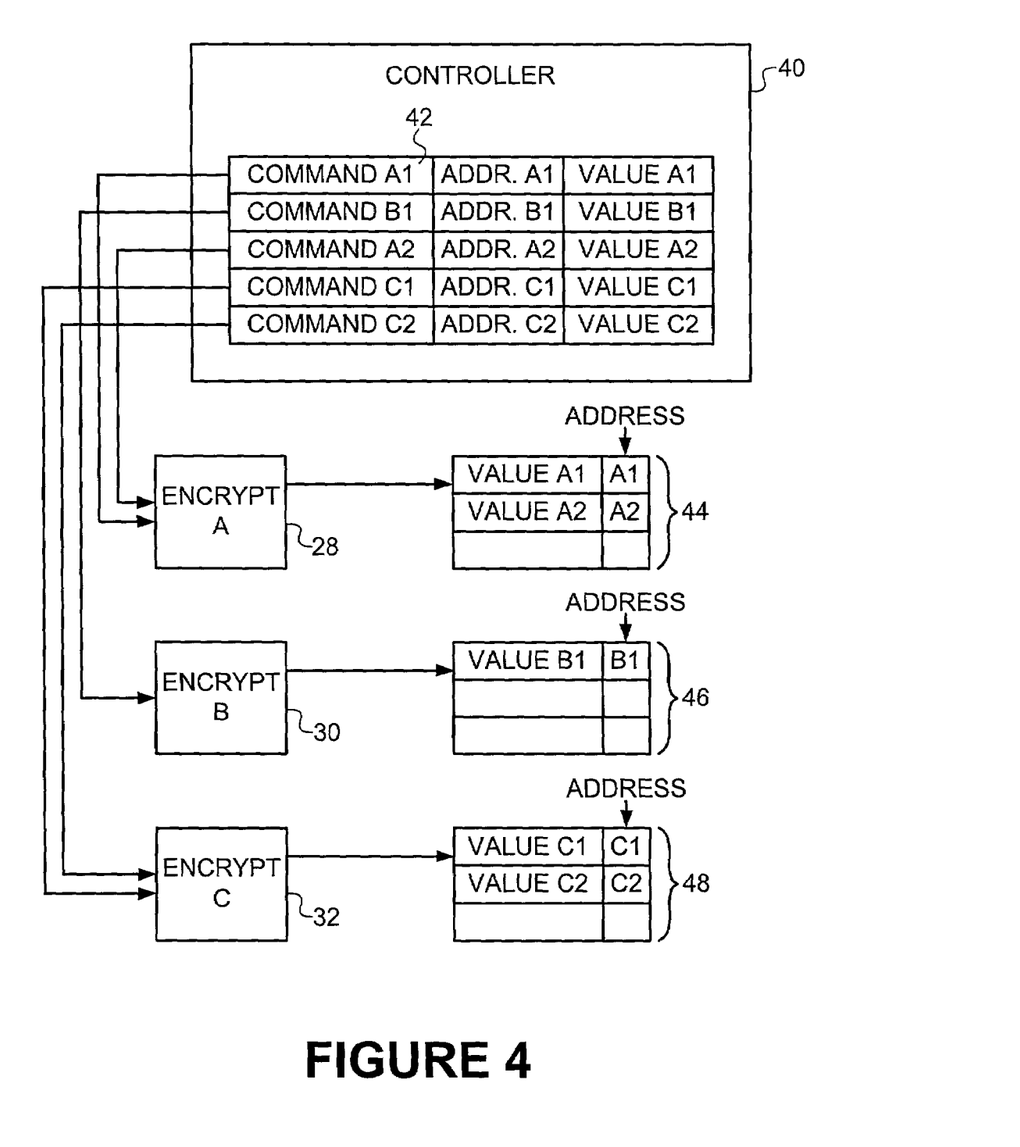
FIG. 4 is a block drawing of a first embodiment of the present invention.

FIG. 4 illustrates an embodiment of how computational resources on the multifunction controller 20 can communicate completion of commands issued by the driver. In this embodiment, a controller 40 has a plurality of memory locations 42 in which it stores commands to be issued. Each command is contained in an operational descriptor which includes, among other things, the command itself, a value to be written upon completion of the command, and a memory address which points to or identifies a memory location to which the command's completion indication is to be written. The memory address in the operational descriptor can either be an absolute address or, if memory conservation is necessary, can be an offset from a base memory address. The value to be written upon completion may be any value, including for example the original memory location of the command, an indication that it is a command that must be completed in a specific sequence, and so forth.

In operation, the controller issues the commands in the order they are stacked in the memory locations 42. The commands are categorized, for example according to which component they use on the card 20. Thus, the "A" commands A1 and A2 can correspond, in the multifunction controller 20, to commands issued to the first encryption unit 28; the "B" command B1 to the second encryption unit 30; and the "C" commands C1 and C2 to the third encryption unit 32. Other categorizations are also possible. For example, in another embodiment where there is only one computational resource to execute the commands, the commands might be categorized according to their execution time. In such an embodiment, the "A" commands could be those with small execution times, the "B" commands could be those with medium execution times, and the "C" commands could be those with long execution times.

Once the commands are issued by the controller 40, the appropriate computational resource of the multifunction controller executes the commands sent to it. As each command is completed, its completion status is written to the memory location included in the operational descriptor that contained the command, which will usually be a different location from the memory address where the command originated. In the embodiment shown, three blocks of memory addresses are used to write the completion status: one block 44 for the "A" commands, a block 46 for the "B" commands, and a block 48 for the "C" commands. For each category of commands, the memory blocks have several memory addresses corresponding to the number of commands in that category. As described above, the operational descriptor for each command may either contain an absolute memory address or an offset from a base address. In this embodiment, for example, each of the memory blocks can start at a base address, and the operational descriptor for a command in the category corresponding to that block will contain an offset from the base address for that block. The memory blocks 44, 46 and 48 can be allocated prior to execution of the commands, or may be allocated dynamically according to how many commands there are, or according to the number of categories into which the commands are grouped.

Because the completion status of each command is now written to an arbitrarily programmed memory location, the mechanism for accepting and executing commands is decoupled from the mechanism for reporting their completion, meaning that the component executing the command can write its completion status to that location as soon as it is finished. In contrast to the "descriptor ring" structure shown in the prior art, in the embodiment described the resource need not wait for completion indication of commands issued prior to the one just executed before writing its completion status. Of course, there are situations in which maintaining a certain order of execution and completion of the commands is necessary. For example, commands that execute transmission or reception of data through the I/O unit 26 (FIG. 1) to a computer network must send all the packets in the proper order. To accomplish this, certain commands could be set so that they must be executed in order, for example by including an order indicator in the operational descriptor.

Figure 5:
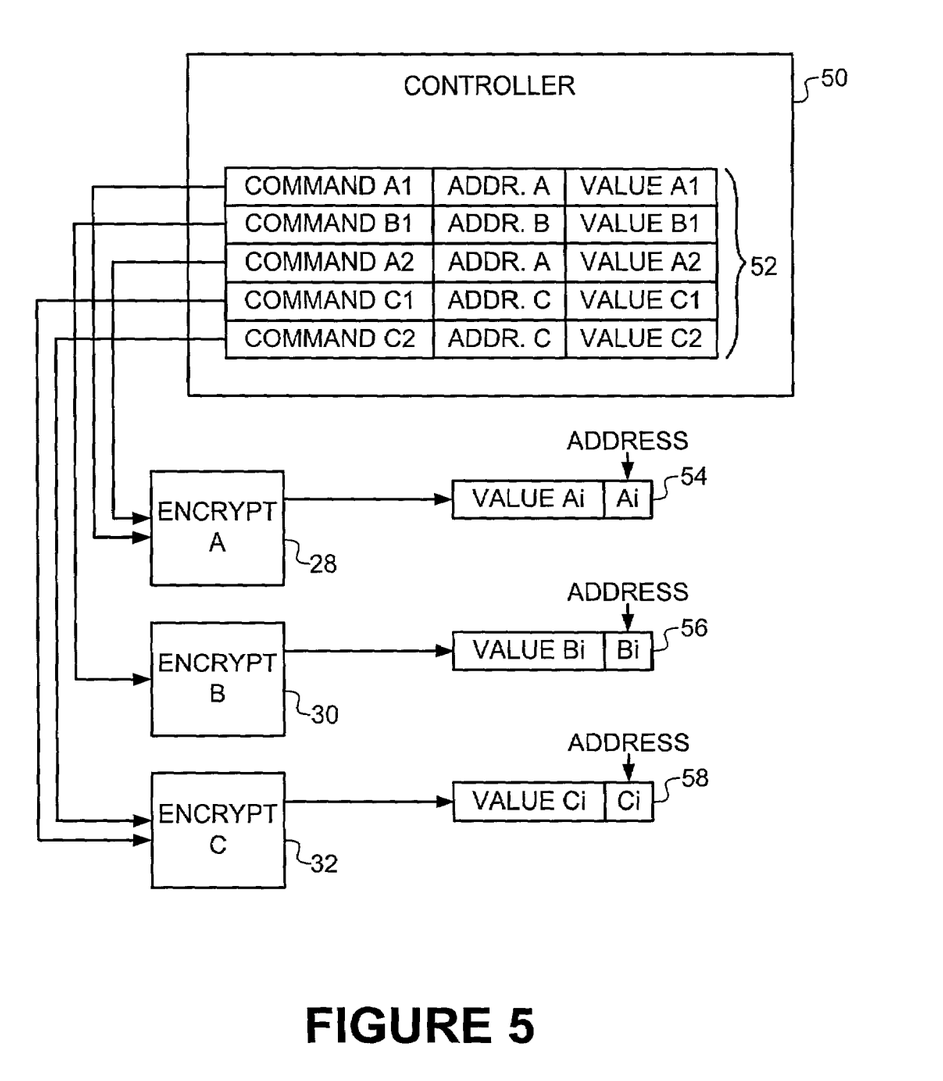
FIG. 5 is a block drawing of a second embodiment of the present invention.

FIG. 5 illustrates an alternative or additional embodiment of the invention. As in the embodiment shown in FIG. 4, this embodiment includes a controller 50 having memory locations 52 in which it stores operational description containing commands to be issued. As shown, the commands are commands A1, B1, A2, and so forth. The controller issues the commands to the appropriate computational resource in the order in which they are stacked in the memory locations 52. As before, the commands are categorized, for example according to which computational resource they use, or according to the time required to execute them. In this embodiment, however, every command in a given category contains the same memory address in the operational descriptor.

As each command is completed, its completion status is written to the memory location contained in its operational descriptor, which will usually be a different location from the memory location 52 where the commands are stacked. In this embodiment, three memory locations are used to write the completion status: one location 54 for the "A" commands, an location 56 for the "B" commands, and a location 58 for the "C" commands. Because each category now has a single memory address to which the completion status is written, a completion status of a command simply overwrites the completion status of an earlier command. This embodiment would be useful to save memory where, for example, all commands in a category must be performed in a specific order, so that the completion value of a later command can overwrite the completion value of an earlier command without creating any difficulties. The memory addresses 54, 56 and 58 can be allocated prior to execution of the commands, or may be allocated dynamically according to the number of categories into which the commands are grouped. The memory addresses 54, 56, and 58 can also correspond to different categories, such as command execution time, as discussed above.

The above description of illustrated embodiments of the invention, including what is described in the Abstract, is not intended to be exhaustive or to limit the invention to the precise forms disclosed. While specific embodiments and examples of the invention are described herein for illustrative purposes, many equivalent modifications are possible within the scope of the claims, as those skilled in the relevant art will recognize. These modifications can be made to the invention in view of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A computer implemented method comprising:
  receiving a plurality of descriptors at a controller, wherein the descriptors are received in a first order and wherein each descriptor includes a command and a memory address identifying a memory location external to the descriptor to which a completion status of the command will be written upon completion of the command;
  executing the command; and
  upon completion of a command included in a respective descriptor, writing a completion status value for the command to the memory address external to the respective descriptor;
  wherein at least some of the descriptors comprise commands executed by one of multiple encryption units implementing different respective encryption algorithms;
  wherein the multiple encryption units comprise (1) an Advanced Encryption Standard (AES) encryption engine; and (2) a Data Encryption Standard (DES) engine; and
  wherein the controller comprises logic to write a second completion status to a memory address external to a second descriptor prior to writing a first completion status to a memory address external to a first descriptor and wherein controller logic to execute a command in the first descriptor is initiated before execution of a command in the second descriptor is initiated.

2. The computer implemented method of claim 1 wherein the memory address included in the descriptor is an absolute address.

3. The computer implemented method of claim 1 wherein the memory address included in the descriptor is an offset from a base memory address.

4. The computer implemented method of claim 1 wherein the commands are grouped into categories, and the completion status of commands in each category are written to different blocks of memory locations.

5. The computer implemented method of claim 4 wherein the commands are grouped into categories depending on their execution times.

6. The computer implemented method of claim 4 wherein the commands are grouped into categories depending on which of a plurality of resources executes them.

7. The computer implemented method of claim 4 wherein each block of memory comprises a plurality of memory locations.

8. The computer implemented method of claim 4 wherein each block of memory comprises a single memory location.

9. The computer implemented method of claim 1 wherein the value to be written indicates the command's original location.

10. The computer implemented method of claim 1 wherein each descriptor comprises a value to be written to the memory address identifying a memory location external to the descriptor upon completion of the command of the descriptor.

11. An article of manufacture comprising:
a storage medium having instructions stored thereon to be executed by a processor to:
receive a plurality of descriptors at a controller, wherein the descriptors are received in a first order and wherein each descriptor includes a command and a memory address identifying a memory location external to the descriptor to which a completion status of the command will be written upon completion of the command;
execute the command; and
upon completion of a command included in a respective descriptor, write a completion status value for the command to the memory address external to the respective descriptor;
wherein at least some of the descriptors comprise commands executed by one of multiple encryption units implementing different respective encryption algorithms;
wherein the multiple encryption units comprise (1) an Advanced Encryption Standard (AES) encryption engine; and (2) a Data Encryption Standard (DES) engine; and
wherein the controller comprises logic to write a second completion status to a memory address external to a second descriptor prior to writing a first completion status to a memory address external to a first descriptor and wherein controller logic to execute a command in the first descriptor is initiated before execution of a command in the second descriptor is initiated.

12. The article of manufacture of claim 11 wherein the memory address included in the descriptor is an absolute address.

13. The article of manufacture of claim 11 wherein the memory address included in the descriptor is an offset from a base memory address.

14. The article of manufacture of claim 11 wherein the value to be written indicates the command's original location.

15. The article of manufacture of claim 11 wherein each command is stored in a first memory location, and the completion status of each command is written to a second memory location different from the first memory location.

16. The article of manufacture of claim 11 wherein the commands are grouped into categories, and the completion status of commands in each category are written to different blocks of memory locations.

17. The article of manufacture of claim 16 wherein the commands are grouped into categories depending on their execution times.

18. The article of manufacture of claim 16 wherein the commands are grouped into categories depending on which of a plurality of resources executes them.

19. The article of manufacture of claim 16 wherein each block of memory comprises a plurality of memory locations.

20. The article of manufacture of claim 11 wherein each block of memory comprises a single memory address.

21. The article of manufacture of claim 11 wherein each descriptor comprises a value to be written to the memory address identifying a memory location external to the descriptor upon completion of a command of the descriptor.

22. An apparatus comprising:
a controller having a processor to:
accept a plurality of descriptors, wherein the descriptors are received in a first order and wherein each descriptor includes a command and a memory address identifying a memory location external to the descriptor to which a completion status of the command will be written upon completion of the command;
execute the command; and
upon completion of a command included in a respective descriptor, write a completion status for value the command to the memory address external to the respective descriptor;
wherein at least some of the descriptors comprise commands executed by one of multiple encryption units implementing different respective encryption algorithms;
wherein the controller comprises the multiple encryption units;
wherein the multiple encryption units comprise (1) an Advanced Encryption Standard (AES) encryption engine; and (2) a Data Encryption Standard (DES) engine; and
wherein the controller comprises logic to write a second completion status to a memory address external to a second descriptor prior to writing a first completion status to a memory address external to a first descriptor and wherein controller logic to execute a command in the first descriptor is initiated before execution of a command in the second descriptor is initiated.

23. The apparatus of claim 22 wherein the commands are grouped into categories, and wherein the completion status of commands in each category are written to different blocks of memory locations.

24. The apparatus of claim 23 wherein each block of memory locations comprises a plurality of memory locations.

25. The apparatus of claim 23 wherein each block of memory locations comprises a single memory location.

26. The network controller of claim 23 wherein each descriptor comprises a value to be written to the memory address identifying a memory location external to the descriptor upon completion of the command.

27. A system comprising
a controller to accept a plurality of descriptors, wherein the descriptors are received in a first order and wherein each descriptor includes a command and a memory address identifying a memory location external to the descriptor to which a completion status of the command will be written upon completion of the command;
a plurality of encryption units, wherein the units execute commands from the respective descriptors; and
a memory providing the memory locations,
wherein upon completion of a command included in a respective descriptor, the controller writes a respective completion status value for the command to the memory address external to the respective descriptor;
wherein the plurality of encryption units comprise (1) an Advanced Encryption Standard (AES) encryption engine; and (2) a Data Encryption Standard (DES) engine; and
wherein the controller comprises logic to write a second completion status to a memory address external to a second descriptor prior to writing a first completion status to a memory address external to a first descriptor and wherein controller logic to execute a command in the first descriptor is initiated before execution of a command in the second descriptor is initiated.

28. The system of claim 27 wherein the commands are grouped into categories, and the completion status of commands in each category are written to different blocks of memory locations.

29. The system of claim 28 wherein each block of memory locations comprises a plurality of memory locations.

30. The system of claim 28 wherein each block of memory locations comprises a single memory location.

31. The apparatus of claim 28 wherein each descriptor comprises a value to be written to the memory address identifying a memory location external to the descriptor upon completion of the command of the descriptor.

32. A computer implemented method comprising:
receiving a plurality of descriptors at a controller, each operation descriptor comprising a command; and
initiating executing the commands in a first order; and
indicating a completion status of each command, as each command completes, in the order that it completes, which is different from the first order;
wherein at least some of the descriptors comprise commands executed by one of multiple encryption units implementing different respective encryption algorithms;
wherein the controller comprises the multiple encryption units; and
wherein the multiple encryption units comprise (1) an Advanced Encryption Standard (AES) encryption engine; and (2) a Data Encryption Standard (DES) engine; and
the controller comprises logic to write a second completion status to a memory address external to a second descriptor prior to writing a first completion status to a memory address external to a first descriptor and wherein controller logic to execute a command in the first descriptor is initiated before execution of a command in the second descriptor is initiated.

33. The computer implemented method of claim 32 wherein each descriptor further comprises a memory address identifying a memory location to which the completion status for its respective command will be written, and a value representing the completion status to be written upon completion of its respective command.

\* \* \* \* \*